April 19, 1960  J. B. COPENHEFER  2,932,902
FILM DRYING APPARATUS
Filed Nov. 7, 1955  3 Sheets-Sheet 1
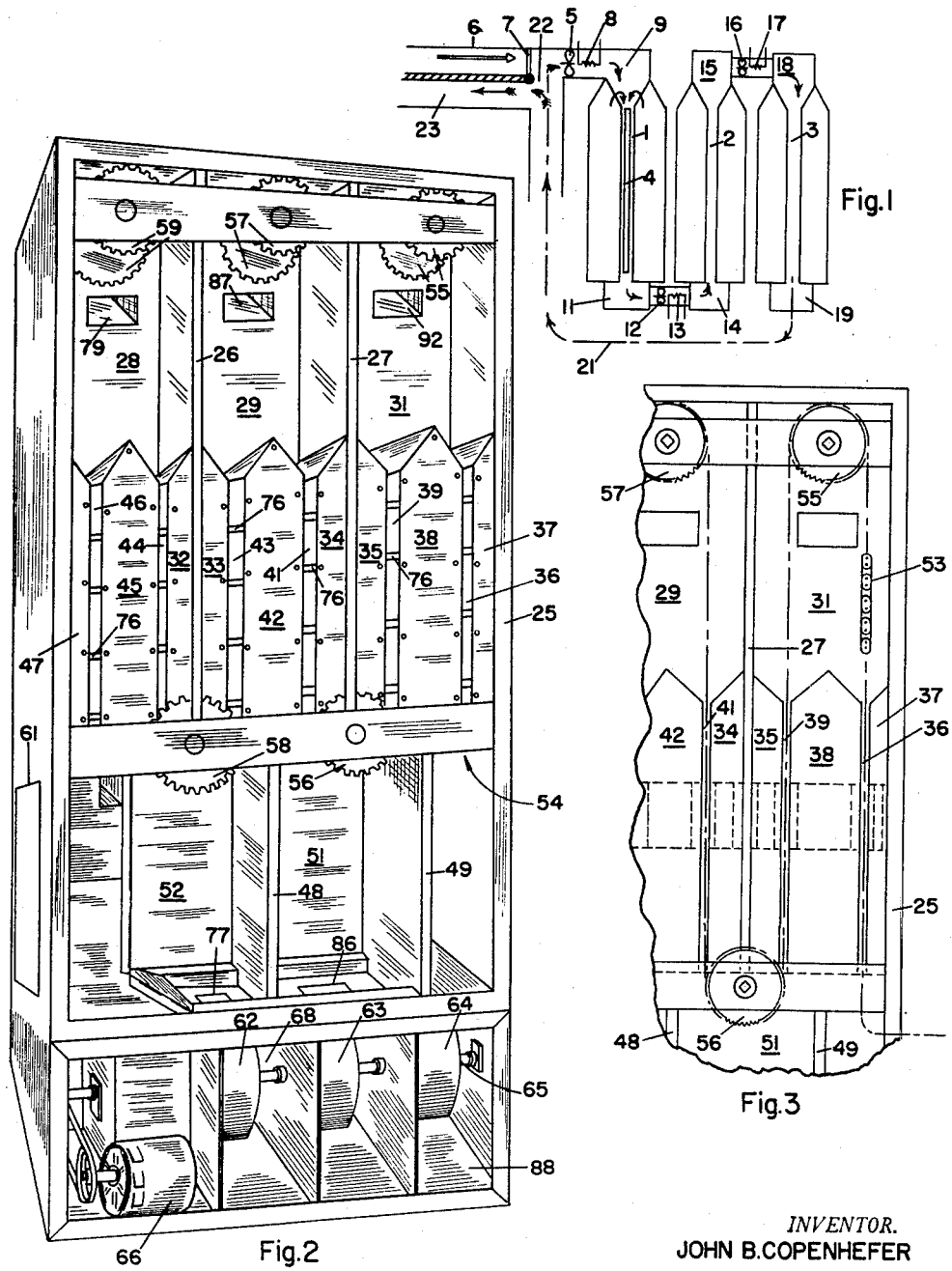
INVENTOR.
JOHN B. COPENHEFER
BY
Arthur Robert
ATTORNEY April 19, 1960     J. B. COPENHEFER     2,932,902
FILM DRYING APPARATUS
Filed Nov. 7, 1955                           3 Sheets-Sheet 2
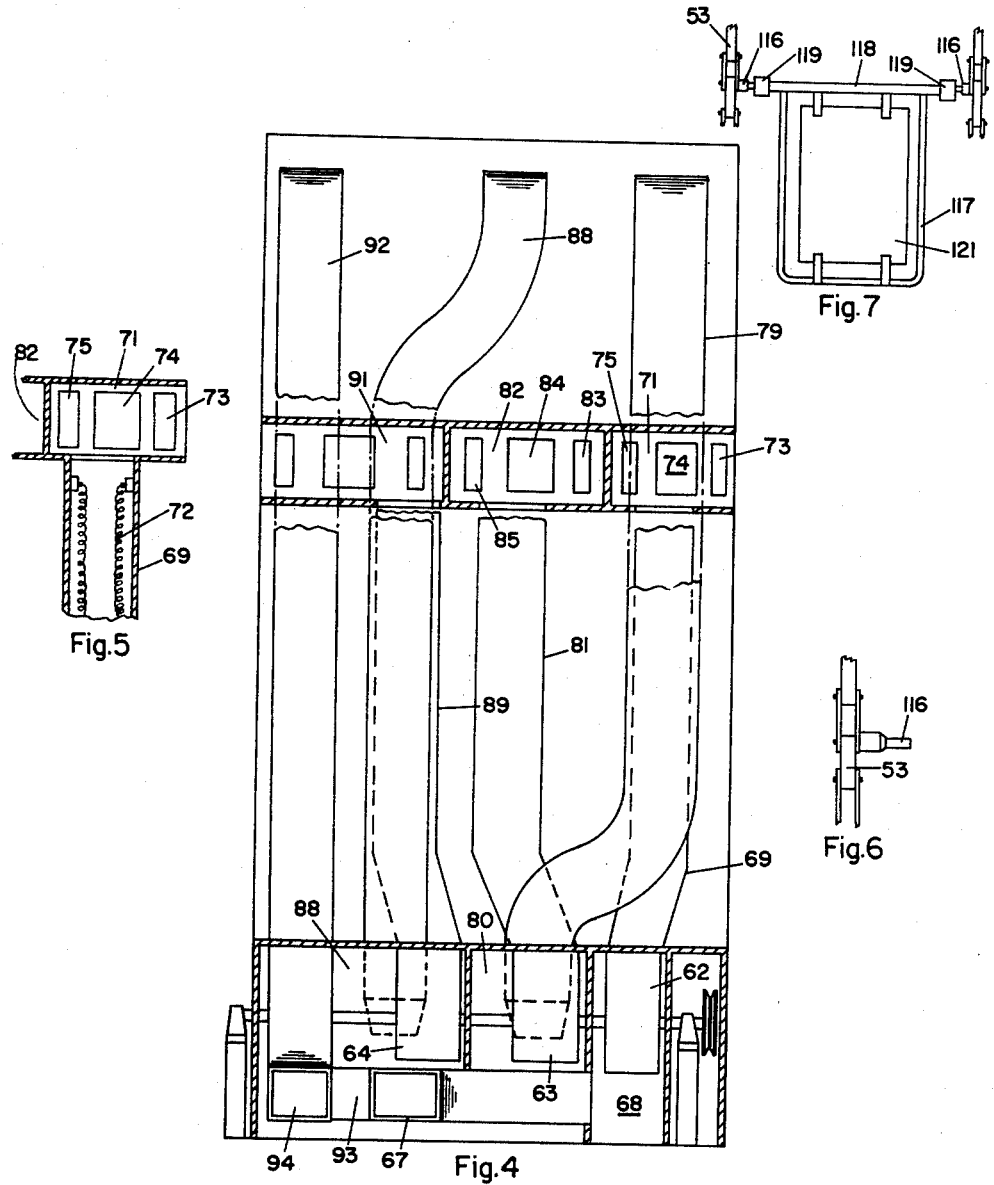
INVENTOR.
JOHN B. COPENHEFER
BY
Arthur H. Robert
ATTORNEY April 19, 1960
J. B. COPENHEFER
2,932,902
FILM DRYING APPARATUS
Filed Nov. 7, 1955
3 Sheets-Sheet 3
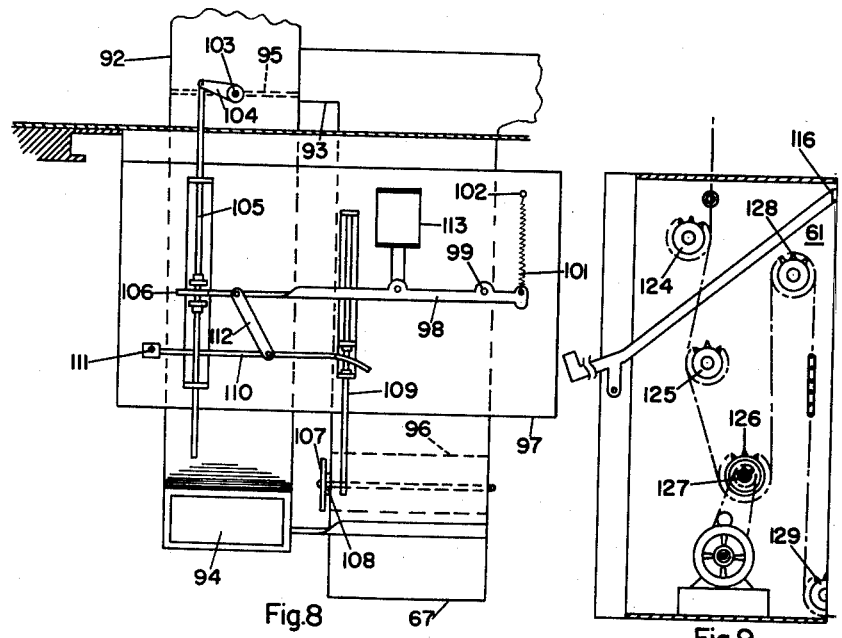
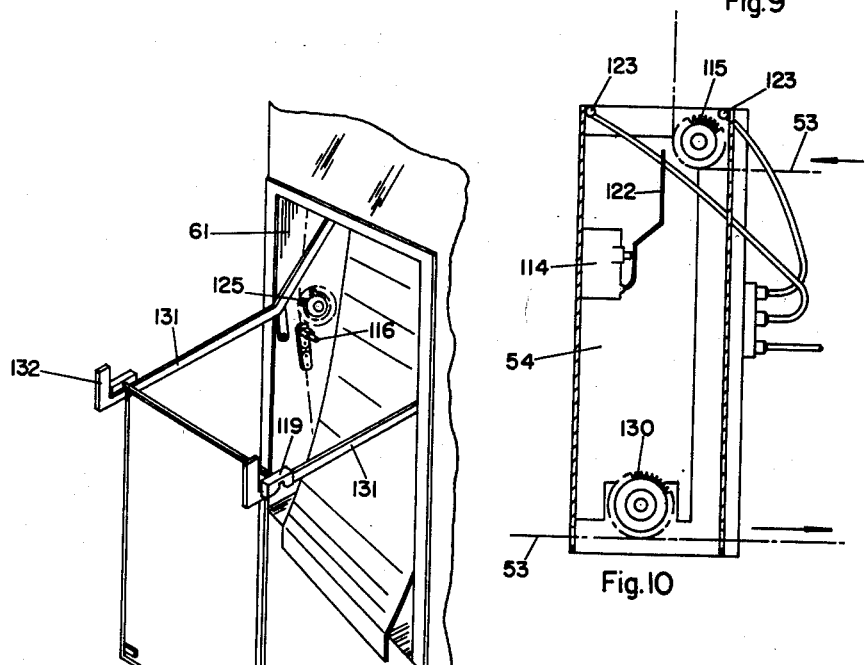
INVENTOR.
JOHN B. COPENHEFER
BY Arthur Robert
ATTORNEY

United States Patent Office 2,932,902
Patented Apr. 19, 1960

2,932,902

FILM DRYING APPARATUS

John B. Copenhefer, Louisville, Ky., assignor to Brown-Forman Distillers Corporation, Louisville, Ky., a corporation of Delaware Application November 7, 1955, Serial No. 545,200

2 Claims. (Cl. 34—159)

The present invention relates to an apparatus for drying photographic emulsion films.

In photography, the silver halide emulsion is applied to a suitable backing, as a thin film. This backing may be in the form of discrete rectangular glass or plastic shapes called plates, or in the form of a continuous strip. The emulsion film softens at about 85° C., and as the film becomes fogged if heated to or above this temperature, it is necessary, in drying developed emulsion film, to keep the temperature of the emulsion film well below the softening temperature. The commercial drying apparatus for photographic emulsion film, of which I am aware, circulate dry air at atmospheric temperature over the emulsion film, and remove moisture from the air by suitable desiccants, such as "Silica Gel." The drying time in such apparatus ranges between about ten to fifteen minutes.

It is an object of the present invention to provide an apparatus for drying photographic emulsion film, in which air heated above the softening temperature of the emulsion may be employed for drying.

A further object is the provision of an apparatus for drying photographic film employing air heated above about 100° C., and in which the film temperature is maintained below the softening point.

A further object is the provision of an apparatus of this character in which the spent air is revivified and recirculated for drying emulsion film.

In accordance with the present invention, I employ heated air for drying the photographic emulsion film on a suitable backing, such as a plate or strip, by passing the air heated to 100° C. or higher, at high velocity against the film; and by maintaining the relative humidity of the air low and limiting the time of exposure of the film to the heated air, I prevent the emulsion temperature rising high enough to damage the emulsion. By employing this method, I am able to dry film in about ninety seconds compared with about ten to fifteen minutes required by other commercially available methods.

It is known that when a wet body is subject to a stream of unsaturated air, water is evaporated from the body and the heat absorbed by evaporation tends to cool the body. The cooling action is a function of the evaporation rate, which in turn depends on the degree of unsaturation of the air stream, and the temperature and velocity of the air stream. In the present invention, atmospheric air is heated to a temperature above 100° C., the heating of the air resulting in lowering the relative humidity thereof and the heated air is driven along the emulsion film surface at a high velocity. Thus, the combined factors of low relative humidity, high temperature, and high velocity, result in a high rate of evaporation of water from the emulsion film. As long as the emulsion film is wet, the temperature of the emulsion film remains substantially below the temperature of the air, due to the cooling effect of the high rate of evaporation of water from the film. The temperature of the emulsion film thus can be kept below the emulsion softening temperature in spite of the high temperature of the air in contact therewith, drying can be completed in as little as one and one-half minutes.

It is, of course, necessary to prevent undue exposure of the emulsion film to the hot air stream after the film has dried, as this would be liable to damage the emulsion. To prevent heat damage, I may remove the emulsion film from the hot air stream while the film is still slightly moist, or the film may be removed from the air stream precisely when it is dry. The former procedure is preferred, as this renders the drying process less critical. That is, the film is removed when it is at incipient dryness, so that only a few seconds exposure to the atmosphere is needed to adequately dry the emulsion film.

I prefer to recirculate the air employed to dry the emulsion film so as to conserve heat. The evaporation of water from the film cools the air in contact with the film, as well as the film, and the air, after passing over the film, may be reheated to decrease its relative humidity, and then passed over the same, or another film. This reheating and recirculating may be repeated until the air absorbs so much moisture that it is unsuitable for further rapid evaporation action. At such time, the moisture laden air is discharged to the atmosphere, and addition or make-up air is introduced into the circulating system.

The high velocity of the air is attained by discharging it at a suitable pressure through small slits or orifices, or through narrow passages of suitable length along the film to be dried. In a continuous drying apparatus, the film to be dried is carried through the drier at the desired speed, and the air flows in contact with the film in concurrent or countercurrent direction as desired.

The invention will be described in greater detail in the following specification taken in connection with the accompanying drawing illustrating preferred apparatus for carrying out the invention, and wherein:

Figure 1 is a diagrammatic view illustrating the operating principle of the invention;

Figure 2 is a perspective view, with a side plate removed, and without the conveyor chain, of an apparatus embodying the invention;

Figure 3 is a fragmentary side elevation of Figure 2;

Figure 4 is an obverse elevational view of Figure 2, with parts in section, the side plate being removed;

Figure 5 is a fragmentary section of a duct showing a heater;

Figure 6 is a front elevation of a part of the conveyor chain;

Figure 7 is a front elevation showing a film and hanger on the conveyor chain;

Figure 8 is a plan view of the damper control for the air inlet and exhaust;

Figure 9 is a diagrammatic view of the discharge end of the drying apparatus;

Figure 10 is a side view with parts in section of the feed end of the drying apparatus;

Figure 11 is a perspective view of the discharge end of the apparatus.

Referring to the drawing, Figure 1, there are shown a plurality of narrow or restricted passageways 1, 2, 3, and an emulsion film 4 to be dried, is located in the passageway 1. It is to be understood, the passageways are so connected and arranged that the film 4 can pass successively through the passageways proceeding from 3 to 1. This emulsion film can be in the form of a plate or continuous strip, as desired. Blower 5 draws in air from the atmosphere through duct 6, as shown by the outline arrow, when damper 7 is open (it is shown closed, Figure 1), and past heater 8, into plenum chamber 9. From the plenum chamber the heated air flows at a high velocity through passageway 1 past the film 4 into a collecting chamber 11.

From chamber 11, a blower 12 forces the air over a heater 13 into plenum chamber 14, and the heated air flows at high velocity through passageway 2 past a film therein (not shown) into collecting chamber 15. As shown, this operation is repeated by blower 16 drawing air from collecting chamber 15 past heater 17 into plenum chamber 18, and from the latter the air flows at high velocity through passageway 3 (which will contain a film) into collecting chamber 19.

From chamber 19, air may recirculate, as shown by the broken arrows 21, back through recirculation inlet opening 22, past blower 5 and heater 8 into plenum chamber 9. However, when damper 7 closes opening 22, air from chamber 19 is exhausted through exhaust passage 23, as shown by the feathered arrows, at the same time that fresh air of equal volume is drawn in through duct 6. The amount of spent air exhausted can be correlated to the quantity of water evaporated, so the desired degree of unsaturation of the circulating air may be maintained.

It is to be understood that the air exhausted at 23 is not necessarily fully saturated. The drying power of the air is related to its degree of unsaturation (that is, the drying power varies generally inversely with the relative humidity) so to maintain the desired high evaporation rate of water from the film, the relative humidity of the air circulating past the film is kept low. The relative humidity of the air drawn in from the atmosphere ordinarily is not controlled, but a low relative humidity is maintained in the air circulating over the film by heating the air in its passage over the various heaters, 8, 13 and 17. Also, as the absorption of water from the film in each pass over the film cools the air, it will be seen that the air discharged at 23 is relatively cool air.

An apparatus for carrying out he above described method is illustrated in Figures 2 to 11. Referring to Fig. 2, the apparatus comprises a suitable frame structure 25 having enclosing panels, and divided by partitions 26, 27 to form upper collecting chambers 28, 29, 31. Around the lower end of partition 26 is formed a casing which provides two plenum chambers 32, 33, these chambers being totally closed except for air inlets and outlets to be later described. A similar housing around partition 27 provides the plenum chambers 34, 35. It will be seen that a vertical passageway 36 is provided between plenum chambers 37, 38, and a vertical passageway 39 is provided between plenum chambers 38, 35. Similarly, a passageway 41 is provided between plenum chambers 34, 42; a passageway 43 is between chambers 42, 33; a passageway 44 is between chambers 32, 45; and a passageway 46 is between chambers 45, 47. These passageways connect at the top to collecting chambers 28, 29 and 31. At the bottom, vertical partitions 48, 49 form collecting chambers 51, 52 and the passageways above noted connect at the bottom with these chambers. The film to be dried is carried by a pair of chains 53 serving as a conveyor (Fig. 3), through end opening 54 (Figs. 2 and 10), up passageway 36, around sprockets 55 and down through passageway 39. At the bottom, the film passes around sprockets 56 in collecting chamber 51, and then up through pasageway 41. The film continues around sprockets 57, down through passageway 43, around sprockets 58, up through passageway 44, around sprockets 59, down through passageway 46, and into exit opening 61.

In the bottom of the cabinet are three blowers 62, 63, 64 mounted on a common shaft 65, and driven by a motor 66 through suitable power transmission mechanism. Referring to Fig. 4, the inlet duct 67 (corresponding to duct 6) conducts atmospheric air to compartment 68, and the blower 62 in this compartment, which has a conventional axial inlet, draws air from compartment 68, and discharges it through duct 69 to supply header chamber 71. Duct 69 contains a suitable thermostat controlled heater 72 (Fig. 5), so that the air supplied to header chamber 71 is heated to a predetermined temperature. A thermostat control, not shown, is preferably located downstream from the heater. From header chamber 71, the heated air flows through ports 73, 74, 75 into plenum chambers 47, 45 and 32 respectively (Fig. 2). Plenum chamber 45 has narrow slits or openings 76 in the wall thereof bordering passageway 46, and chamber 47 has similar slits. Thus, air introduced into chambers 47, 45, is discharged through slits 76 into passageway 46 past the film therein at a high velocity. In each plenum chamber 47, 45, 32, 33, 42, 34, 35, 38 and 37, the wall bordering the passageways 46, 44, 43, 41, 39 and 36, has similar slits 76, and it will be understood these plenum chambers have no air outles, other than the slits, and the air forced through the slits flows along the film in the respective passages.

In passageway 44, air flows upwardly and downwardly, discharging into collecting chamber 28 at the top and collecting chamber 52 at the bottom. Air also flows upwardly through passageway 46 into collecting chamber 28. The suction in chamber 28, as will hereinafter appear, may be sufficient to prevent the escape of any considerable amount of air out opening 61.

From chamber 52, air is drawn through port 77 into compartment 68 surrounding blower 62, to be recirculated. Air from chamber 28 is conducted by duct 79 (see Fig. 4 also) into compartment 80. Here, the air is drawn in by blower 63 and is discharged therefrom by duct 81 past a heater therein, into the header chamber 82, and is distributed through ports 83, 84, 85 to plenum chambers 33, 42 and 34 respectively, and the air escapes from the plenum chambers through slits 76 into passageways 43, 41. The air that flows downwardly from passageway 43 enters collecting chamber 52 and intermingles with air from passageway 44 going back to blower 62. Air that flows downwardly from passage 41 enters collecting chamber 51 and flows through port 86 into compartment 80, from which it is recirculated by blower 63. Air flowing upwardly from passages 43, 41 enters collecting chamber 29 and flows by duct 87 to compartment 88.

From compartment 88, air is drawn into blower 64, and is discharged through duct 89, containing a heater, into header chamber 91, and thence through ports into plenum chambers 35, 38, 37. Air flowing down passageway 39 goes to chamber 51 to be recirculated; air in passageway 36 may discharge through entrance 54, or be sucked up into collecting chamber 31; and air in passageway 39 also flows upwardly into collecting chamber 31 and downwardly into collecting chamber 51. From chamber 31, air is conducted by ducts 92 and 93 back to blower 62, or to exhaust port 94 to the atmosphere, depending on the position of a damper located between the duct 93 and port 94.

As shown in Figure 8, duct 92 is connected by a short duct 93 to inlet duct 67, and a damper 95 is positioned to alternatively close or open duct 92. When damper 95 closes duct 92, the air from duct 92 returns by duct 93 to blower 62, and when this damper opens duct 92, air from duct 92 exhausts to the atmosphere. Intake duct 67, which is connected to duct 93, has a similar damper 96 which is operated in synchronized relation to damper 95, so that when damper 95 opens duct 92, damper 96 opens duct 67, and vice versa.

The synchronizing mechanism is mounted on a plate 97 above duct 67, and comprises a lever 98 pivoted at 99 to the plate, and having a spring 101 secured to one end of the lever and anchored at the other end at 102 to the plate. The damper 95 is mounted on a vertical shaft 103, and arm 104 on the shaft is pivotally connected to a suitably guided slide rod 105. Lever 98 has a forked end 106 which receives rod 105 between suitable abutments on the rod. Thus, clockwise motion of lever 98 around pivot 99 opens damper 95, and the reverse motion closes the damper.

Damper 96 has an operating lever 107 connected through a slot and pin connection 108 to slide rod 109. Slide rod 109 is shifted by a forked lever 110 pivoted at 111, and connected by a pivoted link 112 to lever 98. Thus, clockwise movement of lever 98 turns lever 110 counterclockwise to open damper 96, and vice versa.

Lever 98 is operated by a solenoid 113, which in turn is operated by a switch 114 (Fig. 10), operated each time a film is admitted to the drier. It will be seen that chain 53 enters the drier around sprockets 115. Referring to Figures 6 and 7, the chain 53, at intervals, has fingers 116 extending therefrom. There are two such chains, and between them the fingers support a film hanger 117 of any suitable construction, a preferred form of hanger being described and claimed in my application filed August 8, 1955, Serial No. 527,087, for Film Hanger. Briefly, this hanger comprises a frame, at the top of which is a horizontal bar 118 carrying V notched blocks 119 at its ends. The fingers 116 are received in the notches in these blocks. A film 121 to be dried is suitably supported in the hanger. Referring to Figure 10, the switch 114 has an actuating arm 122 extending upwardly, adjacent the path of chains 53. When a film frame enters the drier cabinet, its horizontal bar 118 engages finger 122 closing switch 114 to actuate solenoid 113, to operate dampers 95, 96. Thus, the blowers discharge a quantity of spent air out of discharge port 94, and suck in a quantity of atmospheric air through duct 67.

The drier carries another similarly arranged switch (not shown) which is closed in a similar manner for an instant when a film frame enters the drier. This second switch actuates a solenoid valve (not shown) in an air line, so that jets of air are discharged from air nozzles 123 against the film, to brush off any droplets of water thereon.

The course of the endless chains 53 is indicated in part in Figures 2 and 3. At the discharge end, shown in Figures 9 and 11, each chain passes down over guide sprockets 124, 125, around sprockets 126, 128 and 129, and back under sprocket 130 (Fig. 10). From here the chain passes out to a film feeding mechanism (not shown) and returns under sprocket 115. A pair of sloping bars 131 are arranged on either side of discharge opening 61, spaced from the side walls, so that the film hanger is received by these bars, while the fingers 116 move out of the V grooves in the blocks 119 to deposit the hanger on these bars. The bars may have upturned ends 132 to act as stops so the film hangers, sliding down the bars to the end, will not fall off. The hangers are manually removed from these bars.

The operation of the invention will be reviewed. The film 121 to be dried, as it comes from the developing operations, is mounted on hangers 117, and the loaded hangers are fed to the conveyor chains 53 by a suitable feed mechanism that is not illustrated. As the film hangers enter the inlet opening 54, they actuate a switch (not shown) which discharges air jets from nozzles 123 to blow off any droplets of water. The hangers also actuate switch 114 through actuating finger 122, to open the fresh air inlet for a short time and open the spent air exhaust, so as to introduce a quantity of atmospheric air into the drier. The chains 53, as they travel around the sprockets 55, 56, 57, 58 and 59, carry the film thereon through the passageways 36, 39, 41, 43, 44 and 46. While in these passageways the film is subject to high velocity blasts of heated air issuing from slits 76, so the film is rapidly dried. The hangers carrying the dried films are deposited from the chains onto the arms 131, from which they are manually removed.

Having described my invention, I claim:

1. A machine for drying wet photographic film comprising: means forming a series of film drying passageways alternating with a plurality of air collection chambers, each air collection chamber being arranged adjacent the ends of a successive pair of passageways and in communication therewith; conveyor means for moving the film successively through each of said passageways and said communicating air collection chambers with the faces of said film being spaced from the walls of said passageways; and means for introducing heated air into each of said passageways intermediate its ends where it flows along both faces of the film into an adjacent air collection chamber and including means for removing air from each air collection chamber, except the first chamber located at the end of the first passageway in said series, heating it and introducing it into another passageway intermediate its ends, and means for removing air from said first air collection chamber, heating it and introducing it into the last passageway in said series, intermediate its ends, said last named means including a blower, means defining a recirculation inlet opening connected to said blower, means defining a fresh air inlet opening connected to said blower, means defining an outlet opening for discharging spent air from the machine, and damper means for simultaneously controlling said openings to allow the entry of fresh air to the blower and the exhaust of spent air from the machine.

2. The machine of claim 1 wherein: a damper-actuating means is provided adjacent the path of said film conveyor means and in position to be intermittently actuated thereby.

References Cited in the file of this patent

UNITED STATES PATENTS

| | | |
|---|---|---|
| 1,479,453 | Carleton et al. | Jan. 1, 1924 |
| 2,012,115 | Woodruff | Aug. 20, 1935 |
| 2,225,505 | Offen | Dec. 17, 1940 |
| 2,553,516 | French | May 15, 1951 |
| 2,601,080 | Andrews | June 17, 1952 |
| 2,659,162 | Katz | Nov. 17, 1953 |
| 2,724,907 | Walter | Nov. 29, 1955 |
| 2,758,356 | Kawaguchi | Aug. 14, 1956 |
| 2,772,486 | Johansson | Dec. 4, 1956 |
| 2,775,046 | Kabelitz | Dec. 25, 1956 |

FOREIGN PATENTS

| | | |
|---|---|---|
| 652,038 | Germany | Oct. 23, 1937 |